United States Patent [19]

Griffin

[11] Patent Number: 4,669,195

[45] Date of Patent: Jun. 2, 1987

[54] GUIDE LINE ANGLE INDICATOR

[76] Inventor: Curtis W. Griffin, Rte. 2, Box 309, Rocky Mount, Va. 24151

[21] Appl. No.: 870,964

[22] Filed: Jun. 5, 1986

[51] Int. Cl.⁴ .............................................. G01C 9/12
[52] U.S. Cl. .................................... 33/339; 33/1 LE; 33/369; 33/391; 33/413
[58] Field of Search .............. 33/339, 1 LE, 369, 391, 33/353, 413

[56] References Cited

U.S. PATENT DOCUMENTS

| | | | |
|---|---|---|---|
| 505,937 | 10/1893 | Brown | 33/369 |
| 1,166,019 | 12/1915 | Taylor | 33/369 |
| 1,855,651 | 4/1932 | Roberson | 33/369 |
| 3,591,925 | 7/1971 | Dupin | 33/369 |

FOREIGN PATENT DOCUMENTS 564562  6/1957  Italy ....................................... 33/369

Primary Examiner—William D. Martin, Jr.
Attorney, Agent, or Firm—Charles R. Rhodes; Judith E. Garmon

[57] ABSTRACT

A lip extends along the free side of the base of a protractor for suspending the protractor upside down from a guide cord. A freely hanging weight or "plumb bob" is suspended from the center point between the protractor base lines. When the plumb bob points to a predetermined angle on the protractor scale, the guide cord will be laid out along the same desired angle from the horizontal.

3 Claims, 5 Drawing Figures

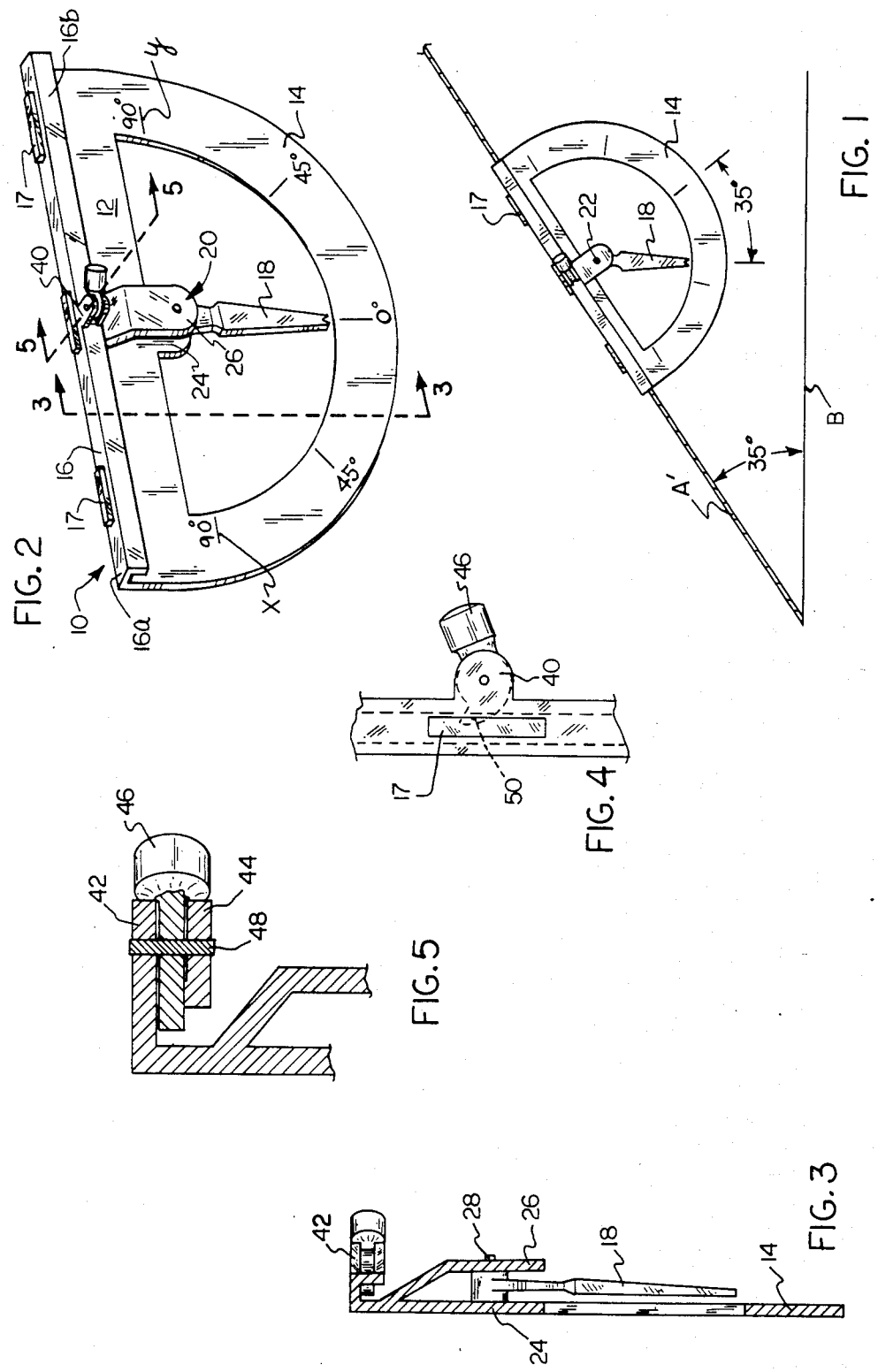

GUIDE LINE ANGLE INDICATOR

BACKGROUND AND SUMMARY OF THE PRESENT INVENTION

This invention is directed to construction instruments, and more particularly to a method and apparatus for laying out imaginary guide lines for masonry, carpentry, steel electrician, pipe fitters, or other types of construction work. During various stages of construction it is often necessary to lay out an imaginary line along which a wall, edge, or other structural element of the construction is desired to follow. This is often accomplished by laying out a cord or string along the desired path. Sometimes the desired path is a horizontal, as in the case of the top of a wall or masonry foundation (line level). Other examples might be an angular extending edge of a roof or other structural element.

A significant problem exists at this time in trying to extend the cord along the desired angle, as there is no existing structural member against or on top of which a level or other simple construction instrument can be placed to ensure the correctness of the angle, and more complex instruments are required. Often it is desired to periodically check the guide cord to make sure it is still accurately positioned, and where complex instruments were initially used, they must be set up again. Therefore, there is a need for some type of simple instrument that can be used in cooperation with a guide cord to determine when the cord is at the proper angle or attitude.

The present invention, then, is directed to such a simple instrument which generally includes a protractor-like instrument having a lip or suspension means along one edge of the base portion thereof, by means of which the protractor-like instrument can be suspended from the cord. In combination with this protractor-like instrument, a plumb bob is suspended from the center point of the protractor scale.

Thus, when the protractor is suspended from the cord by the lip, the position on the protractor scale to which the plumb bob is directed is indicative of the attitude or angle from the horizontal at which the guide cord lies. By adjusting the guide cord until the plumb bob points to the desired angle, the cord may be properly laid out.

As an additional feature there is provided a pivotally activated locking mechanism which, in conjunction with the lip, engages the cord and prevents the instrument from sliding when the cord is extended to extreme angles.

There is thus provided a construction instrument for laying out a projected angular course from a known point at a prescribed angle.

Another object of the present invention is to provide an instrument of the type described which may be utilized even in the absence of a structural element against which a straight edge of the instrument may be positioned.

Other objects and a fuller understanding of the invention will become apparent from reading the following detailed description of a preferred embodiment along with the accompanying drawings in which:

FIG. 1 is an environmental view illustrating the instrument according to the present invention as utilized at a construction site;

FIG. 2 is an enlarged perspective view of the instrument alone;

FIG. 3 is a sectional view of the plumb bob mount taken substantially along lines 3—3 in FIG. 2;

FIG. 4 is an enlarged plan view, with parts broken away of the cord locking device.

FIG. 5 is a sectional view taken substantially along lines 5—5 of FIG. 2.

DETAILED DESCRIPTION OF A PREFERRED EMBODIMENT

Turning now to the drawings and first of all to FIG. 1, there is illustrated the instrument 10 according to the present invention as it is intended to be utilized. Assume that it is desired to lay out a projected angular course of 35° from the horizontal B. In order to accomplish such there is generally laid out a guide cord A along a path that coincides with the structural feature which is intended to lie at a 35° angle. In addition to making sure the cord coincides with the intended path it is necessary to adjust the cord to the 35° angle. This, of course, can be approximated with sophisticated instruments; however, the instrument 10 is a simple, inexpensive approach to solving the problem. The instrument 10 is merely suspended from the cord, which has been laid out along the intended path at approximately the desired angle (35° in this case). The instrument 10 is suspended from the cord and when, upon adjustment of cord A, the weighted element or plumb bob points to the 35° indication on the protractor scale, the guide cord A is at the proper angle.

Turning to FIG. 2 there appears an enlarged illustration of the instrument 10. Generally, instrument 10 includes a protractor means including an upper base member 12 connecting the ends of a depending semicircular member 14. An overhanging and downturned lip 16 is formed along the upper edge of base member 12. Preferably both the upper surface 16a and the underside of lip 16 extend parallel to the base lines of the protractor means which will be described hereinbelow.

A scale or indicia as illustrated in FIG. 2 is inscribed on the curved portion 14. Rather than beginning at one end of the scale and reading from zero to 180°, as appears on conventional protractors, the scale on the instrument 10 utilizes a zero point in the middle of the scale on the curved portion 14. The scale extends from the zero point in both directions to form a semi-circular series of indicia about an imaginary center point 22. Thus, from the zero point on the scale there are 90° in either direction to the end points X, Y. It should be here pointed out that the "center point" 22 of the protractor scale occurs at the midpoint of an imaginary line joining the end points X and Y. Further, the underside of lip 16 must extend and the upper surface of lip 16 should extend parallel to the imaginary line joining end points X, Y, and center point 22 (protractor base line). Thus, when the instrument 10 is suspended from a guide cord the guide cord is parallel to the protractor base line.

A weighted member, or plumb bob 18 is pivotally suspended from lug 20 about center point 22. So arranged, when the lip 16 is seated upon guide cord A, the pointed end of plumb bob 18 will assume or indicate a true vertical. By visually observing the point on the scale where the plumb bob 18 is pointing, one can thus easily determine the attitude or angle of the cord A.

Lug 20 is formed by a pair of walls 24, 26 (FIG. 3). Wall 24 abuts against the lower edge of base member 12 and wall 26 extends outwardly and downwardly from the surface of base member 12 to form a spaced pair of supporting walls. A pin 28 extends through both walls 24, 26 and pivotally supports the upper end of plumb bob 18 which has a mating opening therein (not shown). It should be understood that it is important that the pin 28 extend through the center point of the protractor scale.

At times, the instrument 10 may be used to check the angle of an existing structural member such as a plate, angle, or the like. On such occasions it is not necessary to suspend the instrument 10 from a guide cord, rather the surface 16a of lip 16 must be held against the undersurface of such structural member. For this purpose one or more suspension magnets 17 are attached to upper surface 16a.

At certain other times when the angle of guide cord A is relatively steep and the line is taut, the instrument 10 may have a tendency to slide along the guide cord. Therefore, a cord lock 40 is provided as illustrated in FIGS. 3 and 4. The cord lock 40 is supported by a pair of parallel, spaced, horizontal ears 42, 44 which extend outwardly from the face 16b of lip 16 at some prescribed point therealong, preferably the center point. The locking tab 46 is pivotally mounted between ears 42, 44 by a mounting pin 48. An irregular shaped tip or hook 50 extends outwardly from the rear portion of tab 46 into the channel formed by lip 16. The cord A is engaged by the tip 50 and when the tab 46 is rotated clockwise (FIG. 5), the cord is caused to be gripped between the hook 50 and the inner side wall of lip 16.

In use, the guide cord A is initially positioned along a path judged by the operator to be at the approximate desired angle. The instrument 10 is suspended from the guide cord. The angle at which the plumb bob 18 points will then indicate to the operator the angle of the guide cord. If the guide cord is desired to be horizontal, as in the case of a line level, the plumb bob 18 will point to the zero position which indicates a horizontal condition. Otherwise, the plumb bob 18 will point to the angular attitude from the horizontal at which the guide cord then exists.

While a preferred embodiment of the invention has been described in detail hereinabove, it is apparent that various changes and modifications might be made without departing from the scope of the invention which is set forth in the accompanying claims.

What is claimed is:

1. A construction instrument for laying out imaginary guide lines for masonry, carpentry, steel, or other types of construction comprising:
    (a) an angle indicating means including an upper base member and a depending semi-circular member, the ends of said base member connecting the end points of said semi-circular member, said semi-circular member having an indicia scale theron indicating angular position about a center point, which center point is aligned with and at the mid-point between points the opposite ends of said indicia scale;
    (b) a lug depending from said base member and overlying said center point;
    (c) a weighted pointer member pivotally connected to said lug at said center point, whereby said pointer member functions as a plumb bob;
    (d) said base member having an upper edge extending parallel to an imaginary protractor base line connecting the end points of said indicia scale and said center point; and
    (e) elongated suspension means formed along said supper edge for suspending said base member from a guide cord.

2. The instrument according to claim 1 wherin said elongated suspension means comprises an overhanging and downturned lip formed along said upper edge of said base member, the underside of said lip lying parallel to said protractor base line.

3. The instrument according to claim 1 wherein said elongated suspension means further includes a locking means associated therewith for locking said instrument at a prescribed point on said guide cord.

* * * * *